(12) United States Patent
    Alsina

(10) Patent No.: US 9,667,690 B2
(45) Date of Patent: *May 30, 2017

(54) CONTENT TAGGING USING BROADCAST DEVICE INFORMATION

(71) Applicant: Apple Inc., Cupertino, CA (US)

(72) Inventor: Thomas Matthieu Alsina, Paris (FR)

(73) Assignee: Apple Inc., Cupertino, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 14/341,896

(22) Filed: Jul. 28, 2014

(65) Prior Publication Data

US 2015/0026297 A1    Jan. 22, 2015

Related U.S. Application Data

(63) Continuation of application No. 12/506,950, filed on Jul. 21, 2009, now Pat. No. 8,793,332.

(51) Int. Cl.
    *G06F 15/16*    (2006.01)
    *H04L 29/08*    (2006.01)
    *G06Q 10/10*    (2012.01)
    *G06F 17/30*    (2006.01)
    *G06K 9/00*     (2006.01)
    *G06K 9/78*     (2006.01)

(52) U.S. Cl.
    CPC ........ *H04L 67/02* (2013.01); *G06F 17/30038* (2013.01); *G06F 17/30412* (2013.01); *G06K 9/00288* (2013.01); *G06K 9/78* (2013.01); *G06Q 10/109* (2013.01)

(58) Field of Classification Search
    CPC ...................................................... H04L 67/02
    See application file for complete search history.

(56) References Cited

U.S. PATENT DOCUMENTS

| 6,751,562 | B1 * | 6/2004 | Blackett | G05B 19/4185 |
| | | | | 340/635 |
| 7,826,872 | B2 * | 11/2010 | Ekberg | H04W 4/08 |
| | | | | 455/517 |
| 8,463,725 | B2 * | 6/2013 | Gengembre | G06F 17/30247 |
| | | | | 706/45 |
| 2009/0318119 | A1 * | 12/2009 | Basir | H04M 1/271 |
| | | | | 455/413 |

* cited by examiner

*Primary Examiner* — Hua Fan
(74) *Attorney, Agent, or Firm* — Meyertons, Hood, Kivlin, Kowert & Goetzel, P.C.

(57) ABSTRACT

A number of devices co-located at a geographic location can broadcast and receive identity information. The identity information can include a unique device identifier and a device description. The identity information can be exchanged between various electronic devices using a communication link having limited transmission range. Device identifiers and corresponding device descriptions included in the tokens can be associated with content on the device receiving the tokens. The device descriptions can be used as hints for assigning labels to the devices identified by device identifiers. The labels can be associated with the content. The labeled content can be classified, organized, indexed and searched based at least in part on the labels.

18 Claims, 10 Drawing Sheets

CONTENT TAGGING USING BROADCAST DEVICE INFORMATION

CONTINUATION DATA

This application is a continuation of U.S. patent application Ser. No. 12/506,950, filed Jul. 21, 2009, and entitled "Content Tagging Using Broadcast Device Information," which is incorporated herein by reference in its entirety as though fully and completely set forth herein.

TECHNICAL FIELD

This subject matter is generally related to data communications between electronic devices.

BACKGROUND

Many electronic devices today (e.g., desktop computers, laptop computers, and mobile devices) have multimedia capabilities. Using such a device, a user can create a multimedia file, e.g., make audio recordings, take digital pictures, or produce movie clips, etc. Often, user-created content of a multimedia file relates to a specific event (e.g., concert, tradeshow, business meeting, wedding, or rally) or a specific person (e.g., a relative, a friend, or a colleague). On a conventional device, the user-created multimedia file is usually saved into a default directory using a default name (e.g., IMG_0001), or into a user specified directory using a user specified naming scheme, or in some form of combination of the two. The directories, default names, and user specified naming scheme generally do not reflect the event or the person to which the multimedia file is related. To relate the multimedia file with the event or person, the user is often required to manually rename the file or re-organize the directories. Renaming and re-organizing multiple multimedia files (e.g., movies) and directories created through a period of time can be a time-consuming and error-prone process.

SUMMARY

An electronic device can use information broadcast from nearby devices to label, classify, or index content. A number of devices co-located at a geographic location can broadcast and receive identity information (e.g., hereinafter also referred to as "tokens"). A token can include a unique device identifier (e.g., a MAC address) and a device description (e.g., "Alice's cell phone"). Tokens can be exchanged between various electronic devices using a communication link having limited transmission range (e.g., a Bluetooth link). Device identifiers and corresponding device descriptions included in the tokens can be associated with content on the device receiving the tokens. The device descriptions can be used as hints for assigning labels to the devices identified by device identifiers. The labels can be associated with the content. The labeled content can be classified, organized, indexed and searched based at least in part on the labels.

In some implementations, the device identifiers and corresponding device descriptions included in the tokens can be used to identify a person to whom content is related (e.g., an identity of a person in a picture). A first device can receive a token from a second device. The token can include the device identifier and the corresponding device description. Content (e.g., a multimedia file) can be created on the first device. One or more candidate subjects or objects (e.g., "Alice," "Benji," "Ed") can be identified from the content using pattern recognition technology (e.g., facial recognition). In some implementations, one or more labels associated with the candidate subjects or objects (e.g., "Alice," "Bob," or "Carol") can be identified from a device database using the device identifiers. The candidate subjects or objects can be cross-referenced with the labels. The result of the cross-reference (e.g., "Alice") can be associated with the content as related subject or object.

DETAILED DESCRIPTION

System Overview

Figure 1:
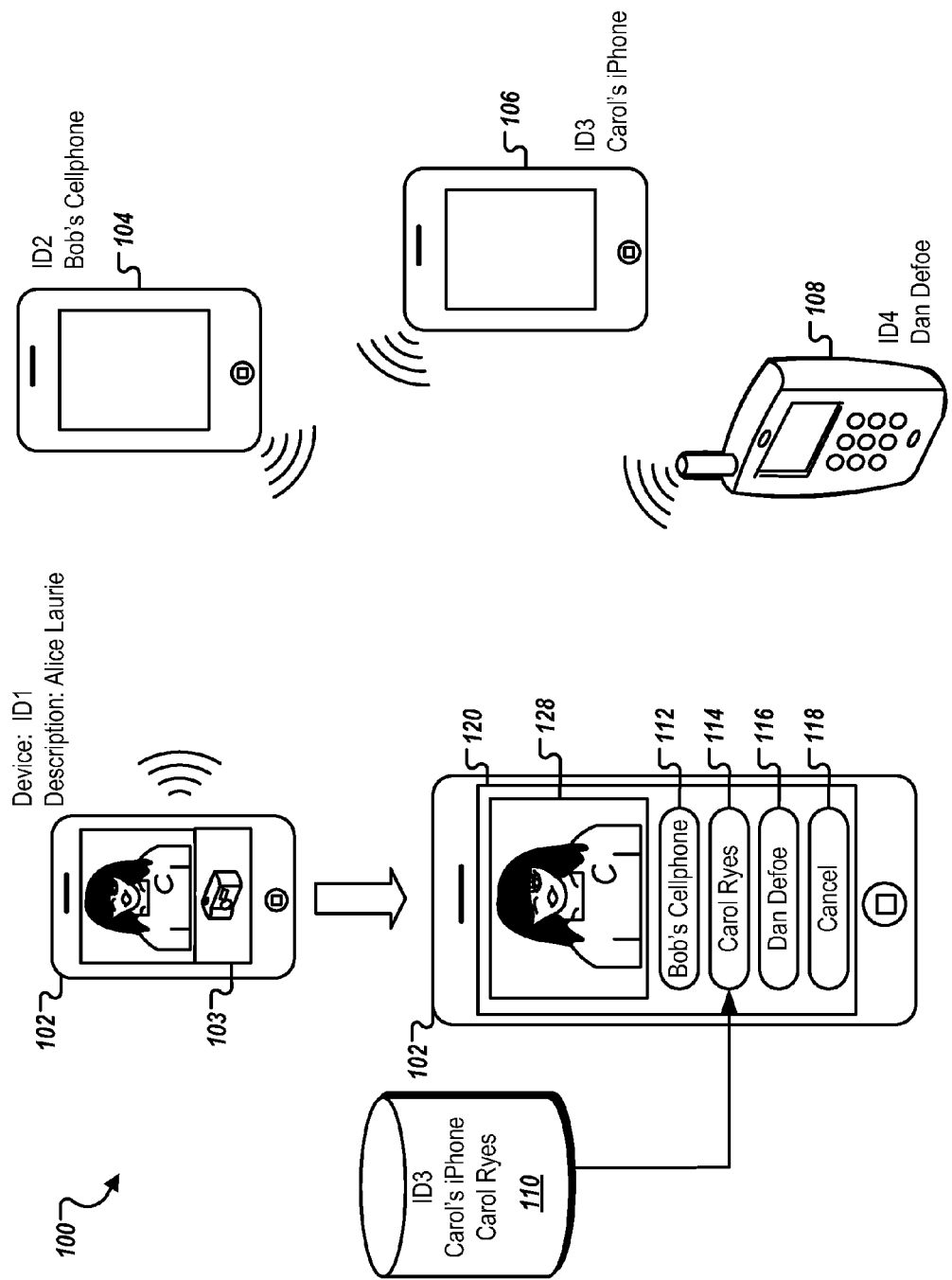
FIG. 1 illustrates an exemplary system for content tagging using broadcast device information.

FIG. 1 illustrates an exemplary system 100 for content tagging using broadcast device information. In some implementations, system 100 generally can include one or more devices 102 coupled to one or more other devices 104, 106, and 108 through one or more networks (e.g., the Internet, wireless network). In the example shown, device 102 can be a mobile device that is capable of communicating with other mobile devices 104, 106, and 108 through a voice network and a data network. The data network through which devices 102, 104, 106, and 108 are connected can include a Personal Area Network ("PAN") in which the devices 102, 104, 106, and 108 can use a wireless protocol (e.g., Bluetooth® protocol) for exchanging data over short distances.

Devices 102, 104, 106, and 108 can include any device capable of communicating with another device, including but not limited to: notebook computers, desktop computers, mobile phones, smart phones, email devices, set-top boxes, game consoles, personal digital assistants (PDAs), media players, digital cameras, video cameras, etc. Internet Protocol (e.g., IPv4) can be used for external communication with network resources, such as the trusted service and one or more content providers.

The system 100 can include any number of devices. Devices can be physically located in clusters (e.g., groups). A group is defined as one or more devices that are in transmission range of each other for a period of time, referred to as a "contact time." A contact time can occur during private or public events or meetings. For example, members of a group can include attendees at a concert or sporting event, attendees at a business meeting, attendees at a tradeshow, attendees at an event or party, etc.

In some implementations, devices 102, 104, 106, and 108 can exchange tokens while within transmission range of each other. A token is a snippet or chunk of data that can be broadcast by a device to other devices that are within the transmission range of the broadcasting device. A token can include one or more data packets that contain information about a mobile device or a user of the mobile device, or both. In some implementations, a token can include a device identifier as well as a corresponding device description. The device identifier can be any information that can uniquely identify a device. Some exemplary device identifiers can include a device's Media Access Control ("MAC") address (e.g., "12:34:56:78:90:AB"), a MAC address of a network interface component in the device, or a Bluetooth ID (which can use an address in MAC format). For mobile devices, device identifiers can include a phone number, an international mobile equipment identity (IMEI) number, an integrated circuit card ID (ICCID), or other forms of identification. Another example of an identifier of a device is an international mobile subscriber identity (IMSI) which can be stored on a subscriber identify module (SIM) card. In some implementations, the device identifier can further include an identifier of a device user (e.g., a wireless service subscriber using the device).

In some implantations, a token can also include a description of a device from which the token is broadcast. In various implementations, the device description can include a telephone number of the device (e.g., "650 839 1700"), a caller ID specified for the mobile device (e.g., "Alice Laurie"), a default name assigned by a service provider to the mobile device (e.g., "Carol's iPhone"), or a customized name (e.g., "Dan Defoe"). The information contained in the description can have free forms (e.g., free style text), therefore may not always be sufficient for uniquely identifying a device or a user. However, the information can often serve as a hint to the identity of the device or the user.

In some implementations (e.g., where Bluetooth protocol is used), a group of devices within transmission range of each other can exchange and store tokens without establishing a real-time communication link. This can be implemented, for example, by overloading data in Bluetooth discovery beacons, inquiry scan requests or extended inquiry scan requests. The non-unique description can be transmitted using these methods and not just using the discovery beacon. The physical size of a group can be defined by the transmission range provided by the communication technology employed. For example, Bluetooth technology can provide a transmission range of about 10 meters (30 feet).

In FIG. 1, devices 102, 104, 106 and 108 are located within a transmission range of each other, and can broadcast and receive tokens to and from one another. Once a token is received by device 102, device 102 can store the received token in a cache. The cache can be a memory area that stores tokens. The cache can be periodically refreshed, e.g., at a fixed interval, when new tokens are received, or when stored tokens are timed out. By examining the tokens stored in the cache, device 102 can identify devices 104, 106, and 108 that are in the transmission range. Each token can include the identification of the device broadcasting the token (e.g., ID 2 for device 104, ID 3 for 106, and ID 4 for 108, etc). In some implementations, the identification can be a Bluetooth address of the respective mobile device (e.g., "12:34:56:78:90:AB"). By receiving the identification, device 102 "knows" that devices 104, 106, and 108 are close by.

A device that has camera capabilities (e.g., device 102) can be used to capture a digital image. If devices 102, 104, 106, and 108 are within transmission range of each other when the digital image is taken, the digital image can be related to the users of devices 104, 106, and 108 (e.g., Bob, Carol, and Dan), because the presence of a device often indicates the presence of the user of the device.

In this example, the user of device 102 (Alice) uses camera function 103 to create a digital picture of a person that is close by (e.g., Carol). After digital image 128 of Carol is created, user interface 120 can be displayed on a touch-sensitive display screen of device 102. Alice can use user interface 120 to assign a label to digital image 128 that was taken. User interface 120 can also include one or more virtual buttons 112, 114, 116, and 118. Each of virtual buttons 112, 114, and 116 can correspond to a device that has been identified to be close by, using the device identification in the tokens received on device 102 and stored in, for example, a device cache of device 102. For example, virtual button 112 can correspond to device 104, virtual button 114 to device 106, and virtual button 116 to device 108. Alice can tap on any one of virtual buttons 112, 114, or 116 to assign a label to digital image 128. Alternatively, Alice can tap on virtual button 118 to cancel (e.g., not to assign a label to digital image 128).

Each of virtual buttons 112, 114, and 116 can present text or other information (e.g., a number) that can be used as a label of the digital image 128. For example, virtual button 112 can display a description of device 104. The description can be the description part (e.g., "Bob's cell phone") of the token received from device 104. Virtual button 114 can display a label of device 106. A label (e.g., a name tag) is a user-entered notation that is unique to a particular device for identifying that device for the user. Similarly, virtual button 116 can display a description (e.g., "Dan Defoe") that is associated with the identification (e.g., "ID 4") of a device (e.g., device 108). Other virtual buttons can be implemented to facilitate other options (e.g., cancel, delete the identification "ID 2" and associated description from the cache, etc)

In the example shown, virtual button 114 can be used to display a label that has already been entered into a storing system. Device 102 can maintain a storage system 110 (e.g., a database) that contains a list of known devices. A known device is a device whose identification has already been stored in the storage system. For example, device 106 can be "known" to device 102 if the ID of device 106 is already stored on device 102. The device list can include the identification of the known device (e.g., "ID 3"), the description of the known device (e.g., "Carol's iPhone"), and a nametag created for the known device (e.g., "Carol Ryes").

By tapping on one of virtual buttons 112, 114, or 116, Alice can assign a label to digital image 128. For example, by tapping virtual button 112, Alice can access a second user interface in which Alice can choose between labeling digital image 128 using the description on virtual button 112 (e.g., "Bob's cell phone"). By tapping virtual button 116, Alice can label digital image 128 using the nametag (e.g., "Carol Ryes"). In various implementations, assigning the label can include associating the label (e.g., a device description or a name tag) to digital image 128, associating the device identification (e.g., "ID 2," "ID 3," or "ID 4") to digital image 128, naming digital image 128 using the label and a sequence number (e.g., "Carol Ryes 0003"), saving digital image 128 in a directory that uses the label as a directory name, using the label as an index in an search indexing engine, etc.

Exemplary Processes for Tagging Content

Figure 2:
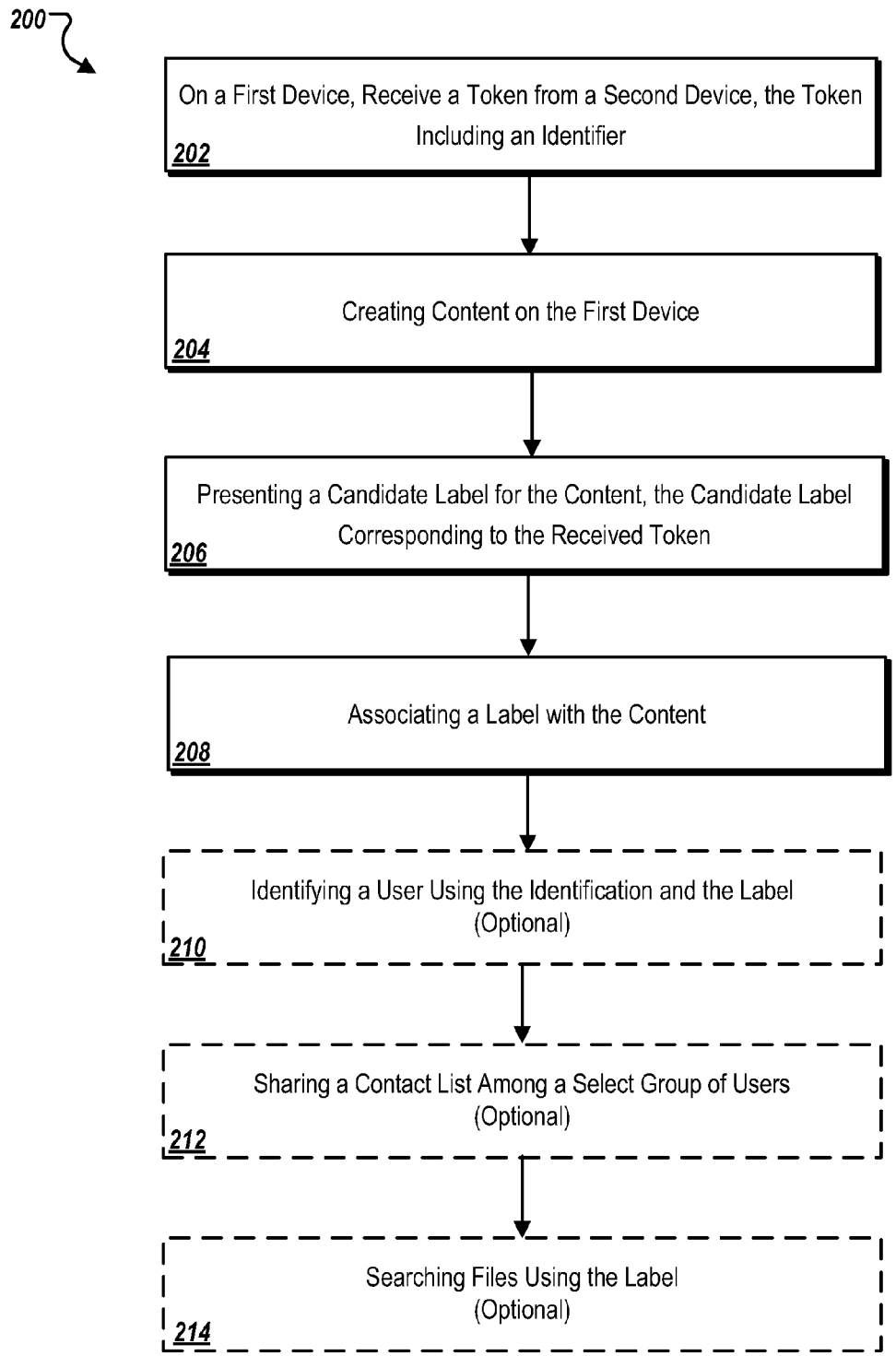
FIG. 2 is a flow diagram of an exemplary process for content labeling on a device using information broadcast from other devices.

FIG. 2 is a flow diagram of an exemplary process 200 for content labeling on a device using information broadcast from other devices. In some implementations, process 200 begins when a first device moves within a transmission range of a second device. The first device (e.g., 102) receives information (e.g., a token) from one or more second devices (e.g., 104, 106, and 108). The token can include an identifier that identifies the second device. In some implementations, the token can further include a corresponding device description for each of the second devices (202). In some implementations, the first device can acquire a description of the second device from a server using the identifier. Tokens can be received directly by each device from the other device (e.g., through a Bluetooth® connection) or through a network (e.g., using IEEE 802.11 protocol) while the first device is located within a transmission range of the second device. The tokens can be received periodically from devices or in response to trigger events.

The tokens can be stored in one or more caches of the individual devices that collected the tokens. For example, devices 102, 104, 106, and 108 can each have a specific storage area for temporarily storing the tokens. The caches of tokens or devices can be built into devices 102, 104, 106, and 108 (e.g., in a memory area of the device), implemented on a storage device (e.g., a flash memory device), or implemented remotely on a server. The tokens can include identifying information in the form of one or more device identifiers (e.g., MAC address, Wife address, MSID, DID, ICCID, IMSI, SIM, USIM, etc). The tokens can also include descriptions of the mobile devices (e.g., telephone number, default device name, user name, etc.)

Various content can be created on the first device (204). Content (e.g., a file) that has been created on the first device can be identified or selected for labeling. The content can have a variety of formats. For example, the content can be a text file (e.g., a text note), a data file (e.g., a spreadsheet), a multimedia file (e.g., a sound recording, a digital image, or a digital movie clip), or in any other format (e.g., a voice mail message, an entry in a data sheet, a record in the database, etc). The content can be created in a variety of ways (e.g., by a text editor on the first device, by a digital camera component of the first device, or by a microphone of the first device).

Identifying the content can include identifying the content that has just been created (e.g., identifying a digital picture right after the picture is taken), or selecting from a list of content that was created when at least one of the second devices was in transmission range with the first device. In the latter case, each content file can be associated with a list of second devices that were present. The user of the first device can have the options of labeling the file with a particular second device or a group of second devices (e.g., multiple labels can be assigned to each file). The user of the device (e.g., Alice of device 102) can use a configuration interface to specify when to associate device tokens with the files (e.g., whether to create the association when the file is created or when the file is saved).

The first device can present one or more candidate labels for the identified content (206). The candidate labels can correspond to the one or more received tokens, including the identifiers in the tokens. A candidate label can be a text string, a number, or other forms of tags (e.g., an icon, an avatar, or a symbol). In some implementations, the label can include a normalized device description. Normalization of a device description can include capitalizing the first letter of each word, removing special characters that are incompatible with the labeling system (e.g., "/" or "?"), and using other string processing techniques (e.g., converting a string to Unicode format). A device description associated with the identification in the token can be free form (e.g., in all capital letters, in all small letters, containing special characters such as slash, single or double quote, question mark, etc.). In some implementations, the device description can be used to label the content without normalization.

The tokens to which the candidate labels correspond can include tokens received during a time window in which the content was created. In some implementations, the tokens are transmitted periodically instead of continuously. Even if the tokens are transmitted continuously, external interferences can prevent the identifiers in the tokens from being correctly recognized. The first device can address these problems by specifying a time window (e.g., from one minute before the content is created through one minute after the content is created). As long as a token is received during the time window, the first device can assume that the device identified in the token is present at the time the content is created, and present candidate labels corresponding to the token.

One or more of the candidate labels can be associated with the content (208). The label can be used to name, tag, classify, or index the content. Using the label to tag content can include using the label as part of a property of a file. The property of the file can be stored either in the operating system or in the file itself as part of the file. Classifying content can include using the label as names of directories or folders in which the content is located.

In some implementations, the label can be associated with the content through an intermediary identifier, such that the identifier is linked to the content, and the label is linked to the identifier. Associating the label to the content through the intermediary can facilitate uniformity when a user modifies a label that is associated with multiple files. For example, five images stored on device 102 are labeled with the nametag "Carol Ryes" through an identifier. When a user changes the nametag from "Carol Ryes" to "Joyce Ryes," the labels of all five images can be changed into "Joyce Ryes" en masse.

In some implementations, the label can be stored as part of the content being labeled. For example, when the content being labeled is a file that contains a metadata section of the content, the label can be inserted into the metadata section and saved with the file. For example, if the content is a file in Resource Interchange File Format (RIFF), an image file in Tagged Image File Format (TIFF) or JPEG format, or an audio file in waveform (WAV) format, the file can contain Exchangeable Image File Format (EXIF) metadata. The label can be stored as a part of the EXIF metadata in a descriptions field. In various implementations, the label can be appended to existing data in the descriptions field, or can replace the existing data in the descriptions field.

In some implementations, a user can be identified based on the identifiers and the descriptions in the token or the nametags in optional step 210. To identify a user, a device can cross-reference the nametags with users in a user list (e.g., a digital address book). Identifying a user can allow the file to be further associated with the user in addition to the label. An exemplary difference between a user and a label is that a "user" can be associated with a more complex data structure on a mobile device than a label. For example, a user record in an address book can contain a phone number, email address, etc. Associating a file with a user can permit cross-referencing between files and users. For example, when digital image 128 is associated with a user "J. Carol Ryes" in addition to the label "Carol Ryes," an entry in an address book for "J. Carol Ryes" can be linked to image 128. A user can access contact information (e.g., email address, phone number) when the user views the image. Furthermore, when a file is associate with a particular user, the file can be sent (e.g., emailed) to the user using a "send this file to user" function that can be implemented in various ways. Thus, files on a device can be organized by users (e.g., users in an address book) in addition to folders.

In some implementations, a contact list containing device identifiers, descriptions, and nametags can be shared among a selected group of users in optional step 212. The contact list can include the device list of known devices as stored in storage system 110. In some implementations, the contact list can further include identities and descriptions stored in the device cache. The contact list on a first device (e.g., device 102) can contain a list of devices that are within a transmission range of device 102. Sharing the contact list can allow one person's nametags on various devices to be transferred to another device. For example, Alice can share a device list stored in storage system 110 on mobile device 102 with Dan. Dan, although never associated a nametag with ID 3 of device 106, can nonetheless acquire the nametag "Carol Ryes" for device 106. When Dan creates a file, the nametag "Carol Ryes" (instead of the description "Carol's iPhone") can be displayed as a label when device 106 is present.

In some implementations, files can be searched using the label in optional step 214. A device can enable searching of files based on the properties of the files (e.g., the name of the file or the directory in which the file is stored or both), the content of the file (e.g., text in a text file, metadata in a digital image, sound recording, or movie), or various indices of the file (e.g., a file property database specifying the content of the file, or an index created from various properties or content of the file). In various implementations, the label associated with a file can be added to a search index of the file to facilitate search.

Figure 3A:
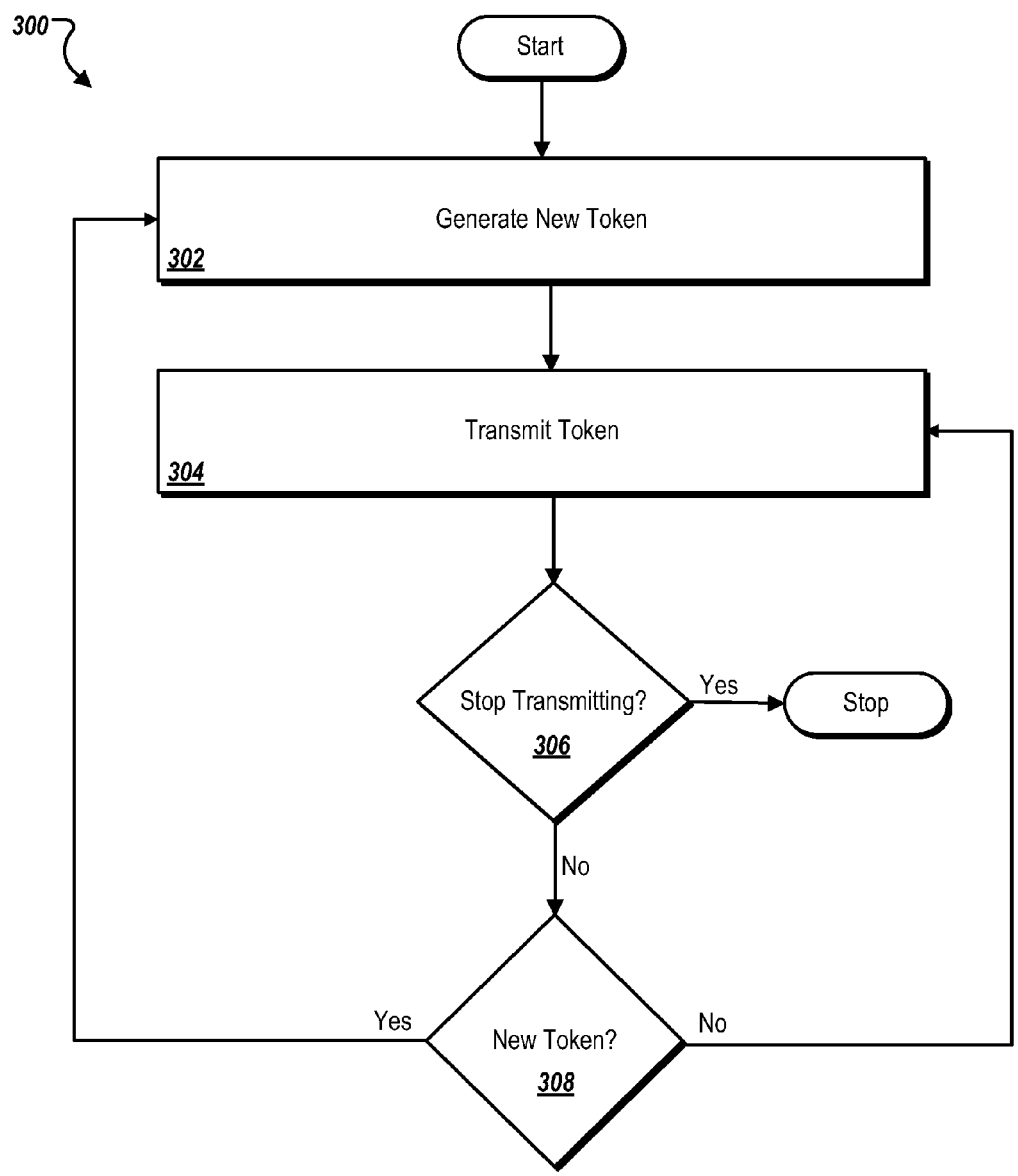
FIG. 3A is a flow diagram of an exemplary process performed by a device for broadcasting tokens to other devices.

FIG. 3A is a flow diagram of an exemplary process 300 performed by a device (e.g., device 102) for broadcasting tokens to other devices. In some implementations, process 300 begins when the device generates a new token (302). If Bluetooth technology is used, this can occur when the user sets their device into an Inquiry state. The token is broadcast to other devices (304) until commanded (e.g., by a device processor) to stop transmitting (306). Periodically, a command can be issued to generate a new token (308) and the process repeats step 302. The new token can be generated to prevent hackers from performing frequency or pattern analysis attacks on devices during contact events. The new token can also be generated to notify other devices that the device is still within a transmission range. Devices that are set in Inquiry Scan state can receive the tokens. The transmission range of the tokens is based on the communication technology used.

Figure 3B:
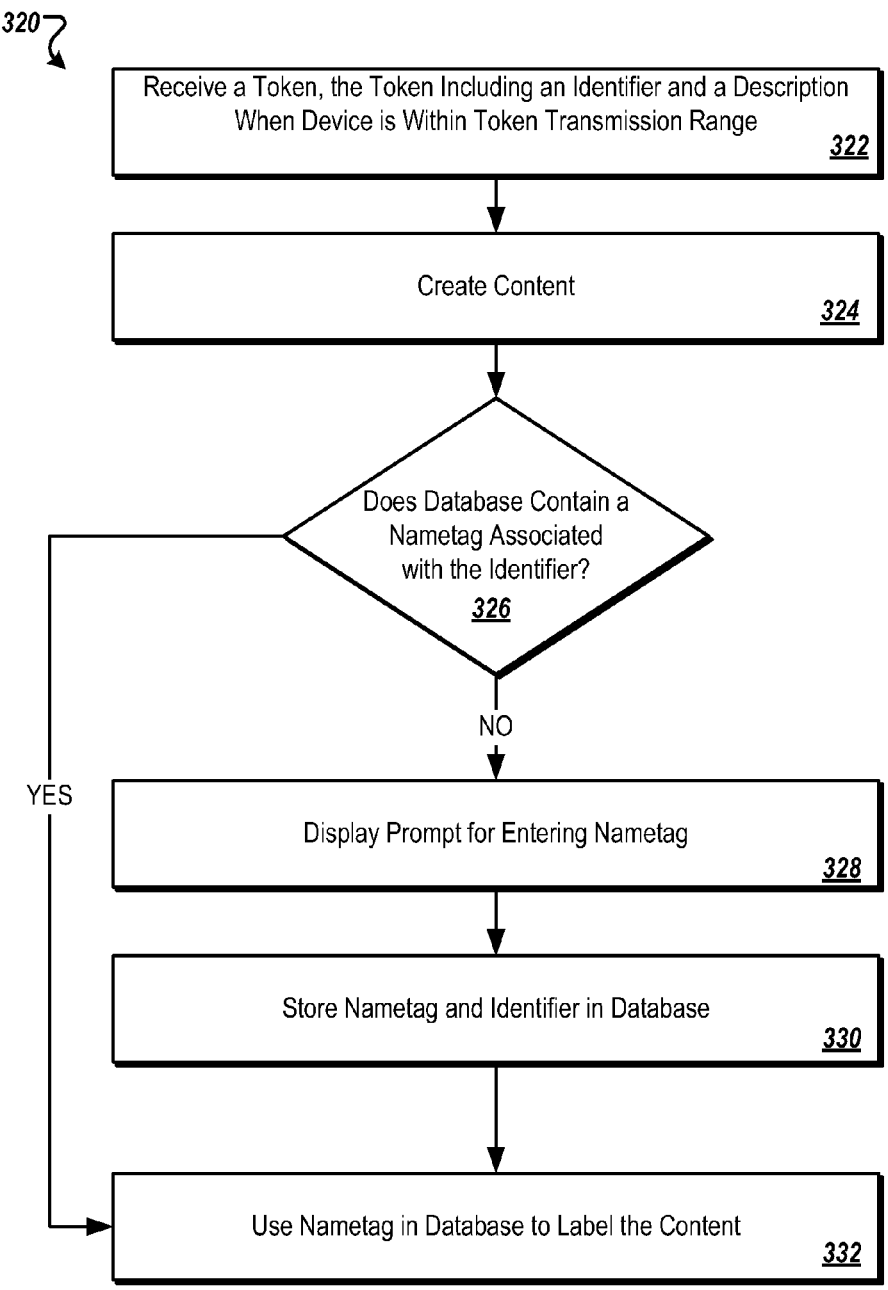
FIG. 3B is a flow diagram of an exemplary process performed by a device for labeling content using broadcast device information and stored labels.

FIG. 3B is a flow diagram of an exemplary process 330 performed by a device for labeling a file using broadcast device information and stored nametags. A first device (e.g., mobile device 102) receives a token (322). The token is broadcast by a second device (e.g., device 104, 106, or 108) that is located close by (e.g., within a transmission range of the first device). The second device can be a mobile device or a stationary or fixed access point or device. The token can include an identifier of the second device and a description of the second device. The first device maintains a device cache, which stores a list of identifiers and descriptions of second devices. In various implementations, the cache can be updated periodically or when the first device receives a new broadcast token. In addition, old tokens can be purged based on a variety of criteria (e.g., timeout). For example, the first device has not received a token from a particular second device for a sufficiently long period of time. Thus, the first device can assume that the second device has moved out of transmission range and delete the token of the second device from the cache.

The first device creates a file when the second devices are within a token transmission range (e.g., when the token is still in the device cache) (324). The file can be identified in a variety of ways, for example, as described above with respect to FIG. 2.

The first device determines whether a storage system 110 (e.g., a database) contains a nametag that is associated with the identifier (326). The first device can perform a look-up of the cached identifiers in the storage system. The storage system can be a component of the first device. The storage system can also be implemented on a remote server that is connected to the first device through a wired or wireless connection.

If storage system 110 contains an entry of a cached identifier (e.g., "ID 3") and a corresponding nametag (e.g., "Carol Ryes"), the first device can use the corresponding nametag as a candidate label (332). If storage system 110 does not contain an entry of the cached identifier, the first device can display a prompt for a user to enter a nametag (328). The prompt can include a virtual button or other user interface element displaying a description associated with the identifier in the token (e.g., virtual buttons 112 and 118). The descriptions can be used as hints for a user to enter nametags. For example, the user knows that a "Bob's cell phone" description is probably for a device used by Bob, thus the user can enter a nametag (e.g., "Bob") and save the nametag with the identifier (e.g., "ID 2") in the database. In some implementations, a description in a received token can be used directly as a candidate label (e.g., without modification) if the user determines that the description is sufficiently clear. For example, the user can designate the description "Dan Defoe" displayed on virtual button 116 as a nametag associated with ID 4. The nametag entered or designated by the user can be saved in the storage system 110 (330). The user can name, tag, classify, or index the file using the saved nametag (332). For example, the user can label the file "Dan Defoe" after the user designates "Dan Defoe" as a nametag associated with ID 4.

Figure 3C:
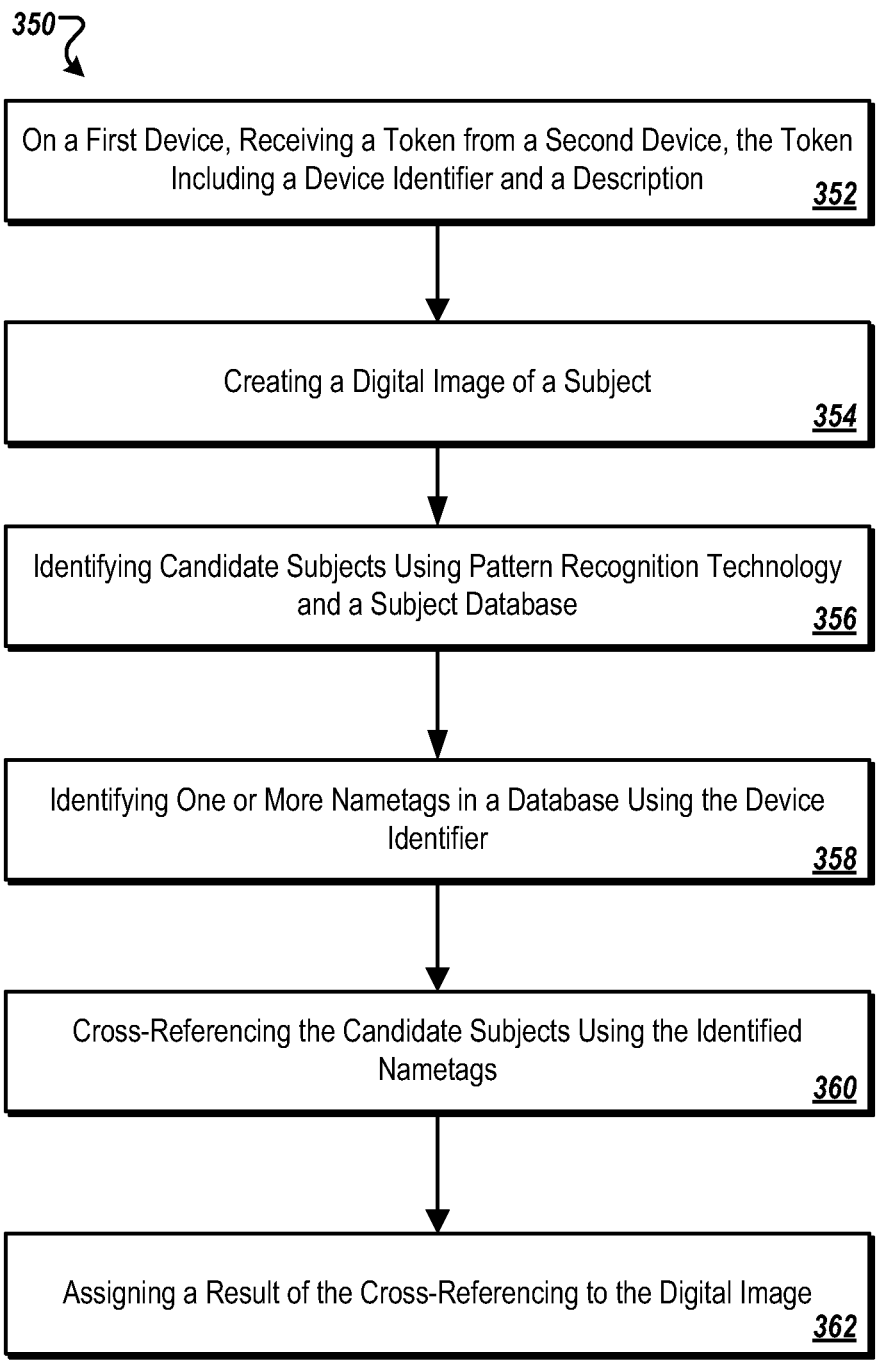
FIG. 3C is a flow diagram of an exemplary process performed by a device for tagging a digital image using broadcast device information and pattern recognition techniques.

FIG. 3C is a flow diagram of an exemplary process 350 performed by a device for tagging a digital image using broadcast device information and pattern recognition techniques. A first device (e.g., device 102) receives a token broadcast from a second device (352). The token can include a device identifier and a device description. A digital image of a subject or object (e.g., a digital image of a user of the second device) is created on the first device (354).

One or more candidate subjects or objects (e.g., persons) are identified based on the digital image using pattern recognition technology and a subject database (356). The digital image created in step 354 can include, for example, one or more faces. Various facial recognition technologies can be applied to identify persons whose faces are in the digital image. In some implementations, identifying the candidate subjects can include comparing selected facial features from the digital image and facial features stored in the subject database. The subject database can contain facial features of known users (e.g., user names from an address book) and facial features that have been associated with known nametags.

The device identifiers in the received tokens can be used to enhance the reliability of the facial recognition techniques. One or more nametags in a database are identified using the received device identification (358). The details of creating and locating nametags in a database are describe above with respect to FIG. 3B.

The nametags are cross-referenced with the candidate subjects identified using the facial recognition technology (360). For example, Alice uses device 102 to take a digital picture of a person. The digital picture contains a facial image of the person. Applying facial recognition technology, the first device 102 can determine that there is a 50% likelihood that the person in the picture is Amy Yang, 35% likelihood that the person is Benji Ramoza, and 30% chance that the person is Carol Ryes. The likelihoods are computed by matching the features in the digital image with known facial features of Amy Yang, Benji Ramoza, and Carol Ryes stored in a subject database.

In some implementations, device 102 can use a built-in magnetometer to assist the computation o the likelihood of matching. If a candidate subject in a picture has already been confirmed (e.g., a user confirms that a person in a picture is Carol Ryes) when device 102 is pointing to one direction (e.g., north) that is determined by the magnetometer at the time the picture was taken, device 102 can adjust the likelihood of the subject in another picture taken shortly after the first picture is taken. For example, if device 102 is still pointing north when taking a second picture, the likelihood of a person in the second picture is Carol can be increased. On the other hand, if device 102 is pointing south when taking the second picture, the likelihood of the person in the second picture is Carol can be decreased.

Device 102 can cross-reference the device database by matching the nametags in the device database with the candidate subjects. For example, the nametags can include "Carol Ryes" and "Dan Defoe." The nametag "Carol Ryes" matches a name of a person whose facial image is likely in the digital picture. Therefore, the probability of the person in the picture actually being Carol Ryes is increased.

A result of the cross-referencing can be assigned to the digital image (362). Assigning the result of the cross-referencing can include presenting a list of possible names of the person to the user, accepting a user selection of one or more of the names, and associating the one or more selected names to the digital image. Presenting a list of possible names can include ordering the names according to the probability that each named person is in the picture. The probability can be calculated using the likelihood from the facial recognition techniques. The probability can be further enhanced by the cross-referencing. The ordered names can be displayed in a respective virtual button or other user interface element. A user can select one or more names by tapping on one or more virtual buttons. More than one name can be associated with a digital image, for example, when the digital image contains more than one face that is recognizable.

Content tagging is not limited to tagging digital images as illustrated in FIG. 3C. For example, an audio recording can be similarly tagged when voice recognition techniques are used in place of facial recognition techniques. Similarly, handwriting recognition techniques and other biometric recognition techniques can also be applied.

Exemplary Mobile Device

Figure 4:
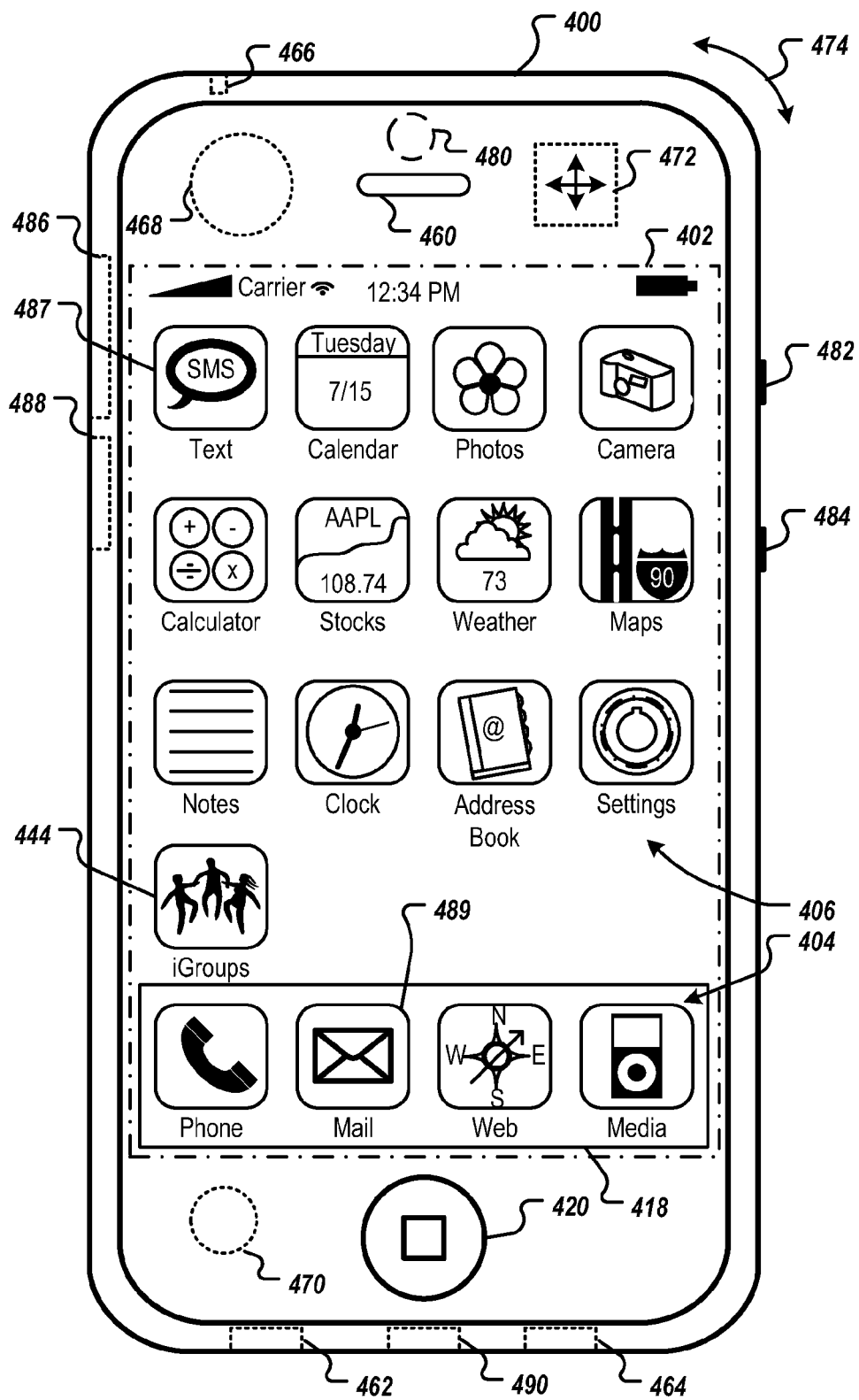
FIG. 4 illustrates an exemplary home screen of a mobile device that performs the processes of FIGS. 3A-3C.

FIG. 4 is a block diagram of an exemplary mobile device 400. Mobile device 400 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, mobile device 400 includes touch-sensitive display 402 or pad. Touch-sensitive display 402 can implement liquid crystal display (LCD) technology, light emitting polymer display (LPD) technology, or some other display technology. Touch sensitive display 402 can be sensitive to haptic and/or tactile contact with a user.

In some implementations, touch-sensitive display 402 can comprise multi-touch-sensitive display 402. Multi-touch-sensitive display 402 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, mobile device 400 can display one or more graphical user interfaces on touch-sensitive display 402 for providing the user access to various system objects and for conveying information to the user. In some implementations, the graphical user interface can include one or more display objects 404 and 406. In the example shown, display objects 404, and 406 can be graphic representations of system objects. Some examples of system objects include device functions, applications, windows, files, alerts, events, or other identifiable system objects.

In some implementations, mobile device 400 can implement multiple device functionalities, such as a telephony device, an e-mail device, a network data communication device, a Wi-Fi base station device and a media processing device. In some implementations, particular display objects 404 can be displayed in menu bar 418. In some implementations, device functionalities can be accessed from a top-level graphical user interface ("home screen"), such as the graphical user interface illustrated in FIG. 4. Touching one of display objects 404 can, for example, invoke corresponding functionality. For example, touching display object 489 would invoke an email application on mobile device 400 for sending text and geographic location data files.

In some implementations, mobile device 400 can implement network distribution functionality. For example, the functionality can enable the user to take mobile device 400 and provide access to its associated network while traveling. In particular, mobile device 400 can extend Internet access (e.g., Wi-Fi) to other wireless devices in the vicinity. For example, mobile device 400 can be configured as a base station for one or more devices. As such, mobile device 400 can grant or deny network access to other wireless devices.

In some implementations, upon invocation of device functionality, the graphical user interface of mobile device 400 changes, or is augmented or replaced with another user interface or user interface elements, to facilitate user access to particular functions associated with the corresponding device functionality. For example, in response to a user touching a phone object, the graphical user interface of touch-sensitive display 402 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 4 can be restored by pressing a button 420 located near the bottom of mobile device 400. In some implementations, each corresponding device functionality may have corresponding "home" display objects displayed on the touch-sensitive display 402, and the top-level graphical user interface environment of FIG. 4 can be restored by pressing the "home" display object.

In some implementations, the top-level graphical user interface can include additional display objects 406, such as a short messaging service (SMS) object, a calendar object, a photos object, a camera object, a calculator object, a stocks object, a weather object, a maps object, a notes object, a clock object, an address book object, a settings object. In the example shown, a display object 444 can be touched to invoke the user interface shown in FIG. 5A.

Additional and/or different display objects can also be displayed in the graphical user interface of FIG. 4. For example, if the device 400 is functioning as a base station (e.g., an access point 114) for other devices, one or more "connection" objects may appear in the graphical user interface to indicate the connection. In some implementations, display objects 406 can be configured by a user, e.g., a user may specify which display objects 406 are displayed, and/or may download additional applications or other software that provides other functionalities and corresponding display objects.

In some implementations, mobile device 400 can include one or more input/output (I/O) devices and/or sensor devices. For example, a speaker 460 and a microphone 462 can be included to facilitate voice-enabled functionalities, such as phone and voice mail functions. In some implementations, an up/down button 484 for volume control of speaker 460 and microphone 462 can be included. Mobile device 400 can also include an on/off button 482 for a ring indicator of incoming phone calls. In some implementations, loud speaker 464 can be included to facilitate hands-free voice functionalities, such as speakerphone functions. An audio jack 466 can also be included for use of headphones and/or a microphone.

In some implementations, proximity sensor 468 can be included to facilitate the detection of the user positioning mobile device 400 proximate to the user's ear and, in response, to disengage the touch-sensitive display 402 to prevent accidental function invocations. In some implementations, touch-sensitive display 402 can be turned off to conserve additional power when mobile device 400 is proximate to the user's ear.

Other sensors can also be used. For example, in some implementations, an ambient light sensor 470 can be utilized to facilitate adjusting the brightness of the touch-sensitive display 402. In some implementations, accelerometer 472 can be utilized to detect movement of the mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into mobile device 400 or provided as a separate device that can be coupled to mobile device 400 through an interface (e.g., port device 490) to provide access to location-based services.

In some implementations, port device 490, e.g., a Universal Serial Bus (USB) port, or a docking port, or some other wired port connection, can be included. Port device 490 can, for example, be utilized to establish a wired connection to other computing devices, such as other communication devices 400, network access devices, a personal computer, a printer, a display screen, or other processing devices capable of receiving and/or transmitting data. In some implementations, the port device 490 allows mobile device 400 to synchronize with a host device using one or more protocols, such as, for example, the TCP/IP, HTTP, UDP and any other known protocol.

Mobile device 400 can also include camera lens and sensor 480. In some implementations, camera lens and sensor 480 can be located on the back surface of mobile device 400. The camera can capture still images and/or video.

Mobile device 400 can also include one or more wireless communication subsystems, such as an 802.11b/g communication device 486, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Content Tagging User Interfaces

Figure 5A:
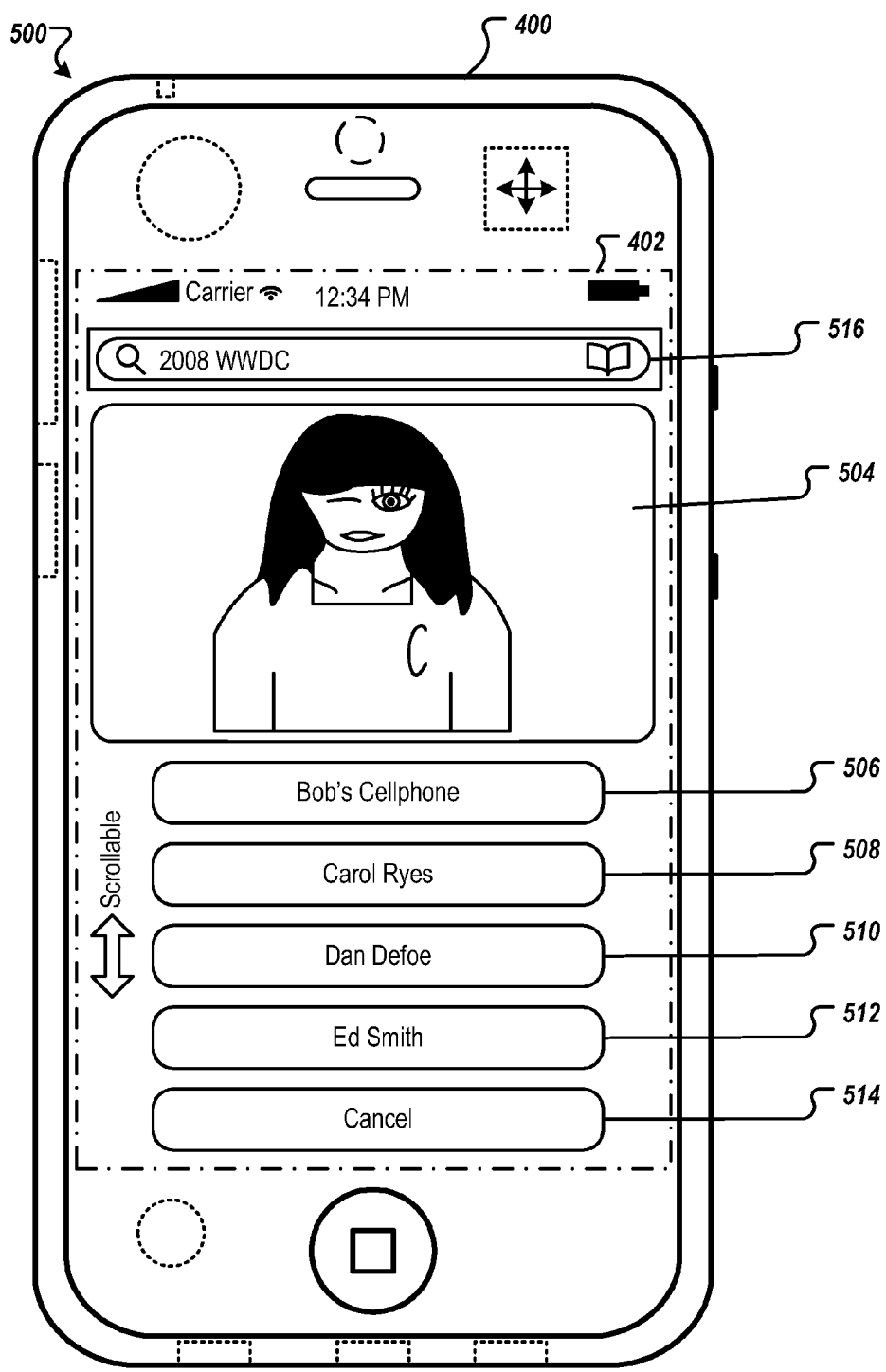
FIG. 5A illustrates an exemplary user interface for tagging content using broadcast device information in accordance with the process of FIG. 2.

FIG. 5A illustrates an exemplary user interface 500 for tagging content using broadcast device information in accordance with the process of FIG. 2. In some implementations, when a user takes a digital picture, makes digital audio recording, or records a digital movie clip on a mobile device 400, various information of user interface 500 can be displayed on touch-sensitive display 402. User interface 500 invites a user to tag the digital picture, the audio recording, the movie clip, or other content, as described in reference to FIG. 2.

In a content display area 504, content of a file (e.g., digital image 128) is shown. A user can tag (e.g., associate a label with) the content by tapping virtual button 506, 508, 510, or 512. "Cancel" button 514 permits the user to leave the content un-tagged. In some implementations, search field 516 can be provided to allow users to search for files using search queries (e.g., a search query containing search terms "Carol Ryes"). Thus, a user can store numerous files on the device or on a remote file server at a network storage provider and search those files from the device. Users can also use groupings of nametags as bookmarks to categorize the files (e.g., "Colleagues," "Friends," Baseball Team," etc.)

In the example in FIG. 5A, five virtual buttons 506, 508, 510, 512, and 514 are shown. In some implementations where more than five virtual buttons need to be displayed (e.g., when 10 mobile devices are within token transmission range with each other), or when additional options are available, the virtual buttons and additional options can be viewed by applying a "flicking" gesture to touch-sensitive display 402 with one or more fingers, stylus, or other indicator. The flicking gesture can cause the user interface to scroll up or down, revealing the additional options. Some additional options can include deleting a device from the device cache. The option for deleting a device can be desirable when, for example, a third device that does not belong to the group happens to be nearby (e.g., when a roommate's Bluetooth device is present in a gathering where the roommate is not invited and not present).

User interface 500 is one example of possible user interface design. Other designs are possible, including designs with more or fewer user interface elements (e.g., including animated elements and transitions) and which convey more or less information to the user.

Figure 5B:
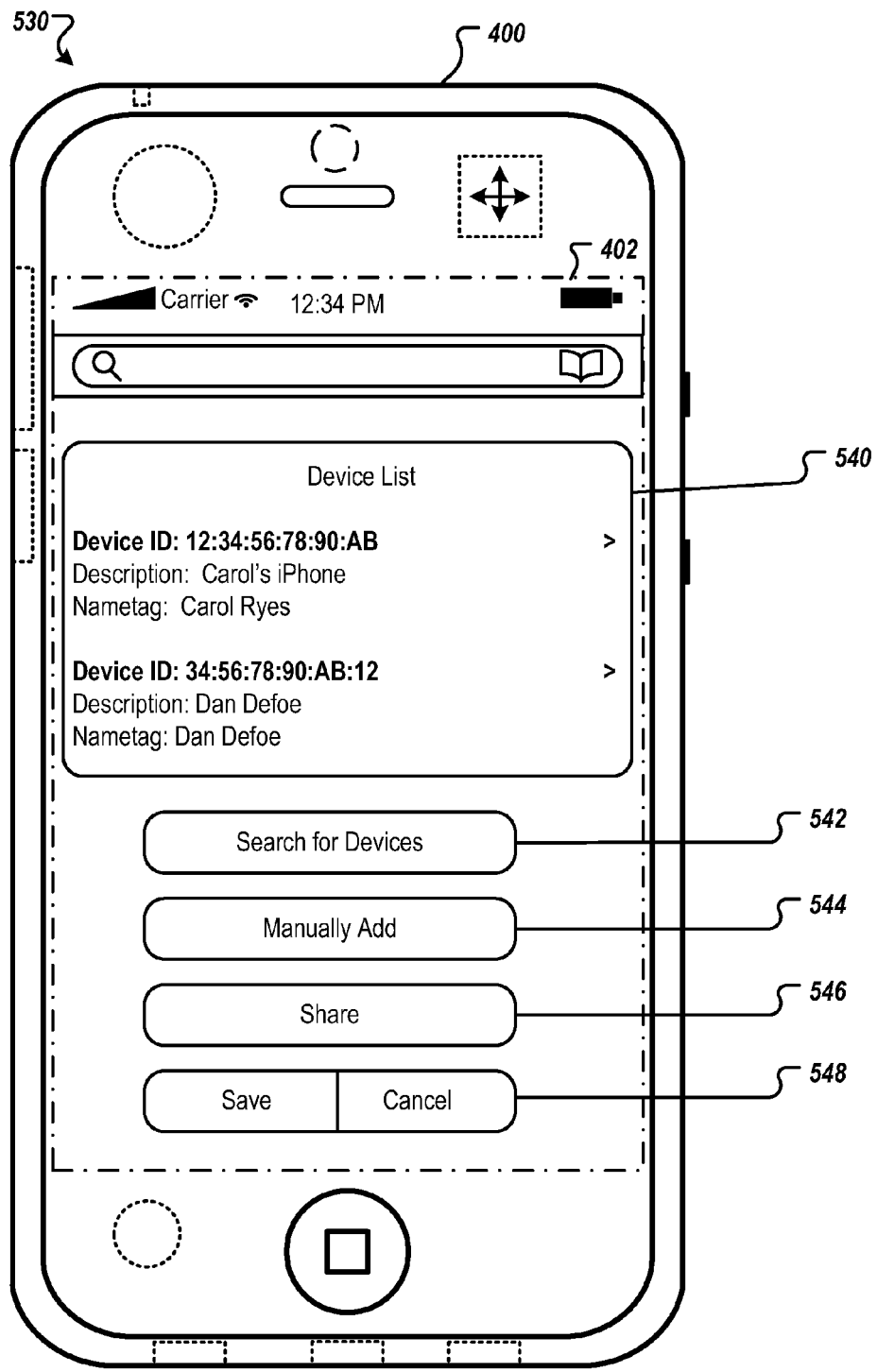
FIG. 5B illustrates an exemplary user interface for managing stored device information.

FIG. 5B illustrates an exemplary user interface 530 for managing stored device information. Device list 540 is displayed on touch-sensitive display screen 402 of mobile device 400. Device list 540 can contain a list of known devices (e.g., devices that have been given nametags). Device list 540 can include the identifier of each device (e.g., MAC addresses or Bluetooth Identifications "12:34:56:78:90:AB" and "34:56:78:90:AB:12"), a device description associated with each device identifier (e.g., "Carol's iPhone" and "Dan Defoe"), and a nametag associated with each device identifier (e.g., "Carol Ryes" and "Dan Defoe").

In some implementations, a user can modify or delete a particular device from device list 540 by accessing a device detail user interface. The user can access the device detail user interface, for example, by tapping a ">" icon associated with the identifier of the device. In some implementations, editing a nametag can cause files already labeled by the nametag to be re-labeled by the edited nametag. In some other implementations, editing a nametag does not change the already-labeled files. Files labeled subsequent to the nametag edit will be labeled using the new nametag.

A user can tap virtual button 542 to add one or more devices to the device list 540. Button 542 can cause device 400 to search for other devices that are within a token transmission range. In various implementations, the search can include consulting the device cache for other devices that are close by. The search can additionally or alternatively include sending an update request that causes devices within the token transmission range to re-broadcast tokens. New device identifiers (e.g., device identifiers not already in the device list 540) in the device cache or received in response to the update request can be displayed in a user interface. The user can select one or more new device identifiers to add to device list 540. In some implementations, the device descriptions associated with the new device identifiers can be designated as default nametags. In some other implementations, the user can be required to enter a new nametag or confirm the default nametag for each added device identifier.

Virtual button 544 can allow a user to add a new device to a device list 540 in a user interface manually. Manually adding a new device can be desirable, for example, when a user knows the details of a device to add but the device is not within a token transmission range and the time. Manually adding a new device can include, for example, manually entering a device identifier, a device description, and a device nametag.

Virtual button 546 can allow a user to share the currently displayed device list 540 with other users. Sharing device list 540 can include, for example, exporting device list 540 to a file and emailing the file to a user in an address book, or sending device list 540 to devices specified in the device list 540. For example, by tapping button 546, the user can send device list 540 to device 12:34:56:78:90:AB ("Carol's iPhone") and 34:56:78:90:AB:12 ("Dan Defoe").

In this example, virtual button 548 is labeled "Save" and "Cancel." Virtual button 548 can allow the user to save the changes that the user made into device list 540 or cancel the changes by tapping on the "Save" or "Cancel" portion of the button 548, respectively.

Network Operating Environment

Figure 6:
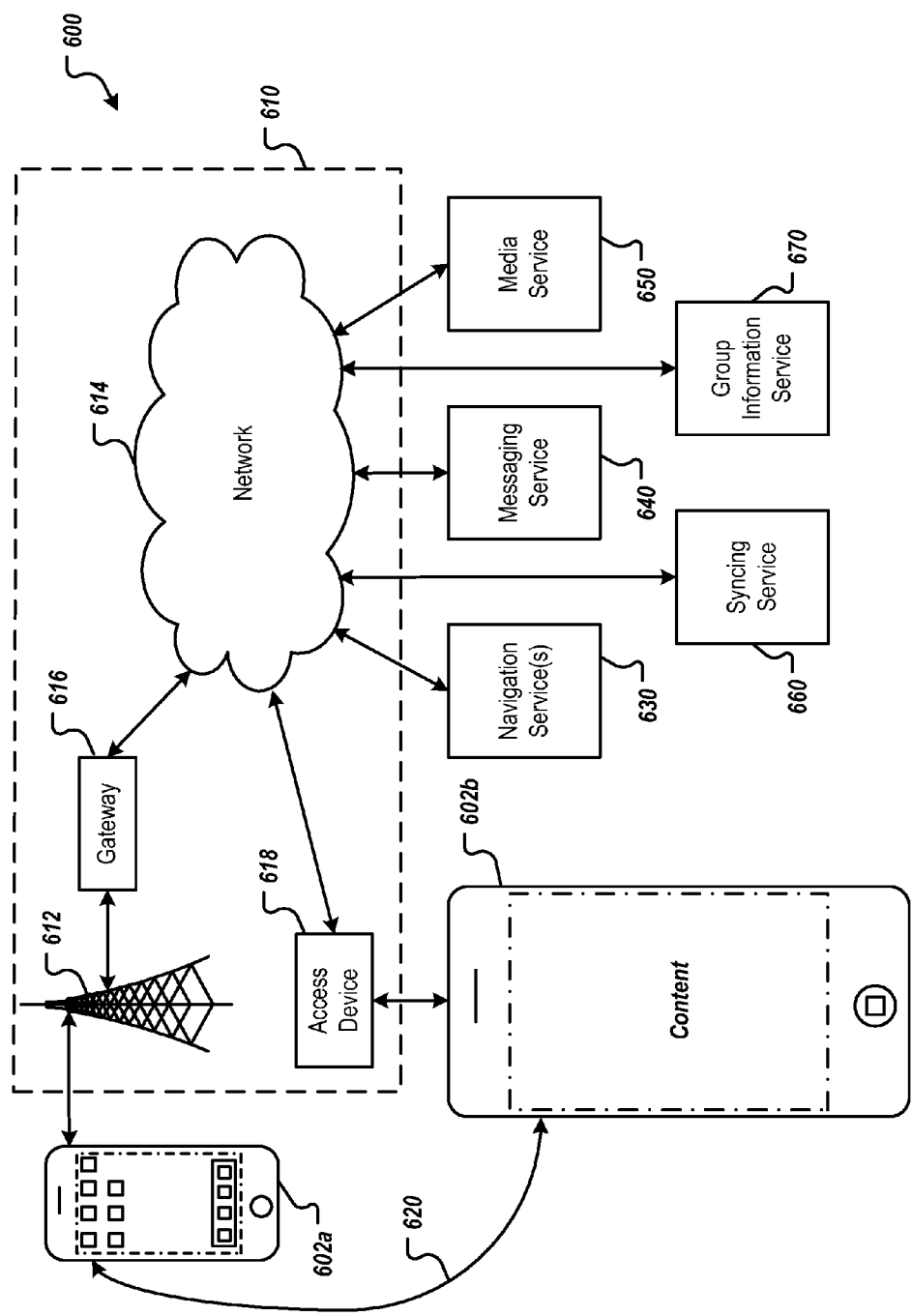
FIG. 6 is a block diagram of an exemplary operating environment for the mobile device of FIG. 4.

FIG. 6 is a block diagram of an exemplary network operating environment for the mobile device of FIG. 4. Mobile devices 602a and 602b can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over the wireless network 612 and the access device 618. For example, the mobile device 602a can place and receive phone calls (e.g., using VoIP protocols), send and receive e-mail messages (e.g., using POP3 protocol), and retrieve electronic documents and/or streams, such as web pages, photographs, and videos, over the wireless network 612, gateway 616, and wide area network 614 (e.g., using TCP/IP or UDP protocols). Likewise, in some implementations, the mobile device 602b can place and receive phone calls, send and receive e-mail messages, and retrieve electronic documents over the access device 618 and the wide area network 614. In some implementations, the mobile device 602a or 602b can be physically connected to the access device 618 using one or more cables and the access device 618 can be a personal computer. In this configuration, the mobile device 602a or 602b can be referred to as a "tethered" device.

The mobile devices 602a and 602b can also establish communications by other means. For example, the wireless device 602a can communicate with other wireless devices, e.g., other mobile devices 602a or 602b, cell phones, etc., over the wireless network 612. Likewise, the mobile devices 602a and 602b can establish peer-to-peer communications 620, e.g., a personal area network, by use of one or more communication subsystems, such as the Bluetooth™ communication devices 112, 116 shown in FIG. 1. Other communication protocols and topologies can also be implemented.

The mobile device 602a or 602b can, for example, communicate with one or more services 630, 640, 650, 660, and 670 over the one or more wired and/or wireless networks. For example, one or more navigation services 630 can provide navigation information, e.g., map information, location information, route information, and other information, to the mobile device 602a or 602b. A user of the mobile device 602b can invoke a map functionality, e.g., by pressing a maps object on the top-level graphical user interface shown in FIG. 4, and can request and receive a map for a particular location, request and receive route directions, or request and receive listings of businesses in the vicinity of a particular location, for example.

A messaging service 640 can, for example, provide e-mail and/or other messaging services (e.g., SMS). A media service 650 can, for example, provide access to media files, such as song files, audio books, movie files, video clips, and other media data. In some implementations, separate audio and video services (not shown) can provide access to the respective types of media files. A syncing service 660 can, for example, perform syncing services (e.g., sync files). A group formation service 670 can, for example, perform the processes described in reference to FIG. 2. Other services can also be provided, including a software update service that automatically determines whether software updates exist for software on the mobile device 602a or 602b, then downloads the software updates to the mobile device 602a or 602b where the software updates can be manually or automatically unpacked and/or installed.

The mobile device 602a or 602b can also access other data and content over the one or more wired and/or wireless networks. For example, content publishers, such as news sites, RSS feeds, web sites, blogs, social networking sites, developer networks, etc., can be accessed by the mobile device 602a or 602b. Such access can be provided by invocation of a web browsing function or application (e.g., a browser) in response to a user touching, for example, a Web object.

Exemplary Mobile Device Architecture

Figure 7:
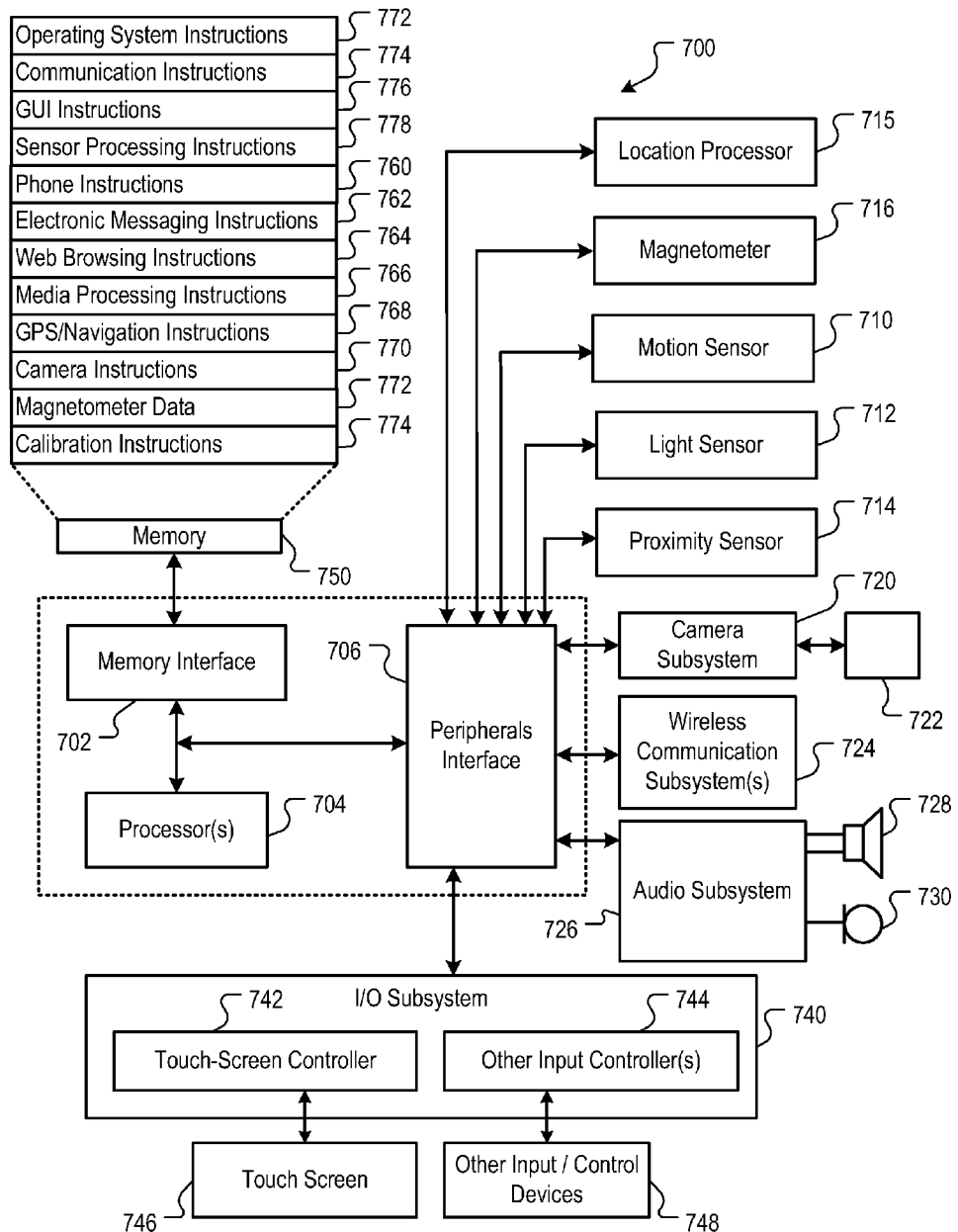
FIG. 7 is a block diagram of an exemplary architecture for the mobile device of FIG. 4.

FIG. 7 is a block diagram of an exemplary architecture 700 for the mobile device of FIG. 4. Mobile device 400 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 400 can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which mobile device 400 is intended to operate. For example, mobile device 400 may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device 400 may be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include a touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 400 on or off. The user may be able to customize a functionality of one or more of the buttons. The touch screen 746 can, for example, also be used to implement virtual or soft buttons and/or a keyboard.

In some implementations, mobile device 400 can present recorded audio and/or video files, such as MP3, AAC, and MPEG files. In some implementations, mobile device 400 can include the functionality of an MP3 player, such as an iPod™. Mobile device 400 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. In some implementations, token exchange instructions can be used to implement the processes described in reference to FIGS. 3A and 3B.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of mobile device 400 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
 on a first device, receiving information from a plurality of second devices located within a communication range of the first device, the information comprising a plurality of identifiers, each identifier associated with one of the second devices;
 identifying a plurality of candidate labels, each candidate label associated with at least one of the identifiers;
 creating an image file on the first device by recording a plurality of images using a camera comprised within the first device, the plurality of images comprising at least one image of a user of at least one of the plurality of second devices;
 assigning an identification probability to each of a plurality of candidate subjects identified in a subject database, wherein the identification probability assigned to each candidate subject represents a probability that the at least one image of the user comprises an image of the respective candidate subject, based on a facial recognition algorithm comparing at least a portion of the image file with the respective candidate subject;
 comparing at least a subset of the plurality of candidate subjects with each of the plurality of candidate labels;
 adjusting the identification probability of each of the compared candidate subjects, based on the comparing; and
 associating at least one of the compared candidate subjects with the image file, using the adjusted identification probability.

2. The method of claim 1, wherein the image file comprises a video file.

3. The method of claim 1, wherein the information further comprises a description of each of the second devices.

4. The method of claim 1, further comprising acquiring a description of each of the second devices from a server using the identifier of the respective second device.

5. The method of claim 1, further comprising:
 presenting to a user of the first device a list comprising one or more of the compared candidate subjects, wherein the one or more of the compared candidate subjects are ordered in the list according to their respective adjusted identification probabilities; and receiving from the user a selection of at least one of the one or more of the compared candidate subjects;

wherein the associating at least one of the compared candidate subjects with the image file comprises associating the at least one selected candidate subject with the image file.

6. The method of claim 1, further comprising:

determining a direction in which the camera is pointing at the time the image file is created;

determining whether the determined direction is the same as a previous direction in which the camera was pointing at the time a previous image file was created, wherein the previous image file has been associated with at least one of plurality of candidate subjects; and further adjusting the identification probability of at least one of the compared candidate subjects based on the determining whether the determined direction is the same as a previous direction in which the camera was pointing at the time a previous image file was created.

7. A non-transitory computer-readable medium having instructions stored thereon, which, when executed by at least one processor of a first device, cause the first device to:

receive information from a plurality of second devices located within a communication range of the first device, the information comprising a plurality of identifiers, each identifier associated with one of the second devices;

identify a plurality of candidate labels, each candidate label associated with at least one of the identifiers;

create an image file by recording a plurality of images using a camera comprised within the first device, the plurality of images comprising at least one image of a user of at least one of the plurality of second devices;

assign an identification probability to each of a plurality of candidate subjects identified in a subject database, wherein the identification probability assigned to each candidate subject represents a probability that the at least one image of the user comprises an image of the respective candidate subject, based on a facial recognition algorithm comparing at least a portion of the image file with the respective candidate subject;

compare at least a subset of the plurality of candidate subjects with each of the plurality of candidate labels;

adjust the identification probability of each of the compared candidate subjects, based on the comparing; and associate at least one of the compared candidate subjects with the image file, using the adjusted identification probability.

8. The non-transitory computer-readable medium of claim 7, wherein the image file comprises a video file.

9. The non-transitory computer-readable medium of claim 7, wherein the information further comprises a description of each of the second devices.

10. The non-transitory computer-readable medium of claim 7, wherein the instructions further cause the first device to:

acquire a description of each of the second devices from a server using the identifier of the respective second device.

11. The non-transitory computer-readable medium of claim 7, wherein the instructions further cause the first device to:

present to a user of the first device a list comprising one or more of the compared candidate subjects, wherein the one or more of the compared candidate subjects are ordered in the list according to their respective adjusted identification probabilities; and receive from the user a selection of at least one of the one or more of the compared candidate subjects;

wherein the associating at least one of the compared candidate subjects with the image file comprises associating the at least one selected candidate subject with the image file.

12. The non-transitory computer-readable medium of claim 7, wherein the instructions further cause the first device to:

determine a direction in which the camera is pointing at the time the image file is created;

determine whether the determined direction is the same as a previous direction in which the camera was pointing at the time a previous image file was created, wherein the previous image file has been associated with at least one of plurality of candidate subjects; and further adjust the identification probability of at least one of the compared candidate subjects based on the determining whether the determined direction is the same as a previous direction in which the camera was pointing at the time a previous image file was created.

13. A mobile wireless electronic device, comprising:

wireless communication circuitry;

a camera; and at least one processor coupled to the wireless communication circuitry and the camera, the at least one processor configured to cause the mobile wireless electronic device to:

receive, via the wireless communication circuitry, information from a plurality of second devices located within a communication range of the mobile wireless electronic device, the information comprising a plurality of identifiers, each identifier associated with one of the second devices identify a plurality of candidate labels, each candidate label associated with at least one of the identifiers;

create an image file by recording a plurality of images using the camera, the plurality of images comprising at least one image of a user of at least one of the plurality of second devices;

assign an identification probability to each of a plurality of candidate subjects identified in a subject database, wherein the identification probability assigned to each candidate subject represents a probability that the at least one image of the user comprises an image of the respective candidate subject, based on a facial recognition algorithm comparing at least a portion of the image file with the respective candidate subject;

compare at least a subset of the plurality of candidate subjects with each of the plurality of candidate labels;

adjust the identification probability of each of the compared candidate subjects, based on the comparing; and associate at least one of the compared candidate subjects with the image file, using the adjusted identification probability.

14. The mobile wireless electronic device of claim 13, wherein the image file comprises a video file.

15. The mobile wireless electronic device of claim 13, wherein the information further comprises a description of each of the second devices.

16. The mobile wireless electronic device of claim 13, wherein the at least one processor is further configured to cause the mobile wireless electronic device to:

acquire a description of each of the second devices from a server using the identifier of the respective second device.

17. The mobile wireless electronic device of claim 13, further comprising at least one input/output device comprising a touch screen display, wherein the at least one processor is further configured to cause the mobile wireless electronic device to:
- present to a user, via the touch screen display, a list comprising one or more of the compared candidate subjects, wherein the one or more of the compared candidate subjects are ordered in the list according to their respective adjusted identification probabilities; and
- receive from the user a selection of at least one of the one or more of the compared candidate subjects;
- wherein the associating at least one of the compared candidate subjects with the image file comprises associating the at least one selected candidate subject with the image file.

18. The mobile wireless electronic device of claim 13, further comprising a magnetometer, wherein the at least one processor is further configured to cause the mobile wireless electronic device to:
- determine, using the magnetometer, a direction in which the camera is pointing at the time the image file is created;
- determine whether the determined direction is the same as a previous direction in which the camera was pointing at the time a previous image file was created, wherein the previous image file has been associated with at least one of plurality of candidate subjects; and
- further adjust the identification probability of at least one of the compared candidate subjects based on the determining whether the determined direction is the same as a previous direction in which the camera was pointing at the time a previous image file was created.

* * * * *